United States Patent Office 3,741,932
Patented June 26, 1973

3,741,932
CURABLE EPOXY ORGANOPOLYSILOXANES HAVING PENDANT CHROMOPHORIC GROUPS
Carl M. Smith, White Bear Lake, Minn., assignor to Minnesota Mining and Manufacturing Company, St. Paul, Minn.
No Drawing. Filed Apr. 10, 1972, Ser. No. 242,827
Int. Cl. C08f 11/04
U.S. Cl. 260—46.5 E                    9 Claims

ABSTRACT OF THE DISCLOSURE

Organopolysiloxane having pendant oxirane groups and pendant chromophoric groups are provided. These organopolysiloxanes cure to transparent cross-linked resins which are colored or fluoresce in ultraviolet light and are compatible with other silicone resins.

This invention relates to organopolysiloxanes having pendant chromophoric groups and oxirane groups, which are compatible with silicone resins and which cure to transparent cross-linked silicone resins which absorb light in the visible or near ultra-violet portions of the spectrum. More particularly, the invention is concerned with organopolysiloxanes having pendant oxirane groups and pendant chromophoric groups which cure to colored or ultra-violet fluorescing silicone resins.

Silicone polymers have found use in a variety of applications for many years because of their ease of fabrication, their lack of toxicity and their serviceability under a wide range of environmental conditions such as in contact with organic and aqueous solutions and at both high and low temperatures. Furthermore, silicone polymers have excellent electrical characteristics making them suitable for use in many electrical applications. The silicone polymers may be pigmented, but have not been dyed because no heretofore readily available dyes are compatible with them. Solutions of silicone polymers containing conventional dyes may be prepared but, insofar as known, there have been no silicone polymers which remain colored after the solvent has been removed and the polymer cured. In the silicone polymers of the prior art, dye is squeezed from the polymer by syneresis as the polymer is cured.

It is an aim and object of the present invention to provide curable organopolysiloxanes which are transparent and colored or fluorescent after being cured to cross-linked resins.

Another object is to provide colored or fluorescing silicone polymers which are compatible with other silicone resins.

Other objects of the invention will become apparent from the reading of the present application.

In accordance with the above and other objects of the invention, it has been found that curable colored or fluorescing organopolysiloxanes can be prepared by reaction of (A) an epoxy organopolysiloxane having the structural formula:

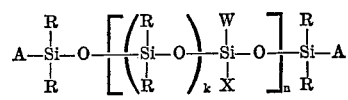

wherein R is methyl, ethyl or phenyl, A is R, OH or halogen, X is an aliphatic oxirane-group-containing radical, W is X or R, $k$ is 2 to about 20 and $n$ is about 5 to about 30 with (B) a chromophoric compound containing as the most acidic group a single secondary sulfonamide group in which in addition to the chromophoric moiety, there is an essentially hydrocarbon moiety of at least 6 carbon atoms.

Suitable epoxy organopolysiloxanes that may be used and the method of their preparation are described in Plueddemann, U.S. Pat. No. 3,455,877.

The curable organopolysiloxanes of the invention are obtained from chromophoric compounds containing a single secondary sulfonamide group —NH—SO$_2$— and possessing unsaturated atomic groupings, commonly termed chromophores including as examples >C=O, —NO$_2$, —N=N—, C=C, C≡C—, >C=S, in sufficient number and configuration to afford selective absorption of light of wavelengths between about 350 and 700 millimicrons. The chromophoric compounds thus absorb both visible and near ultra-violet light, and may be either colored or colorless to the eye, although generally fluorescent in the latter case.

Examples of suitable chromophoric compounds, in which $n$ is 3 or or greater up to about 18 and R' contains at least 6 and up to about 18 carbon atoms, include compounds having structures such as:

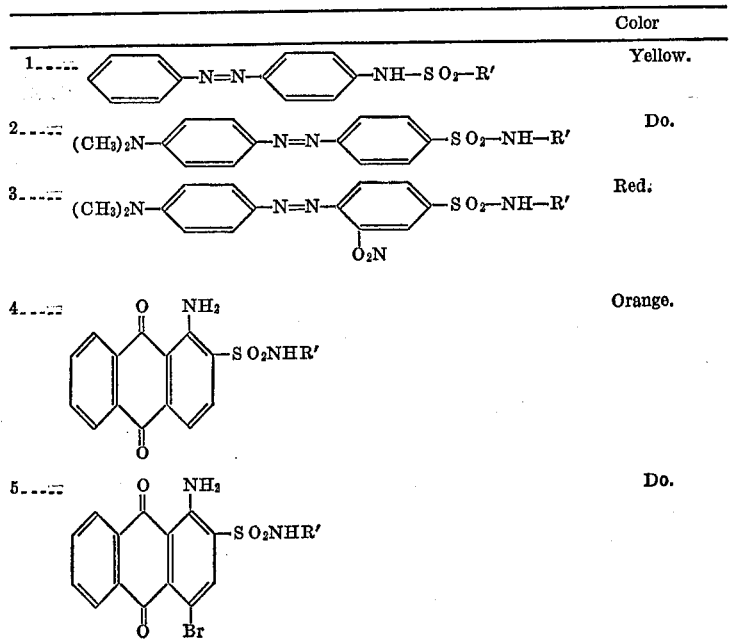

TABLE—Continued
| | | Color |
|---|---|---|
| 6 | 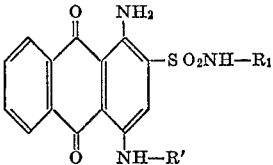 | Blue. |
| 7 | 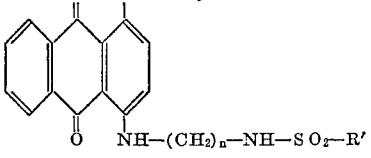 | Do. |
| 8 | 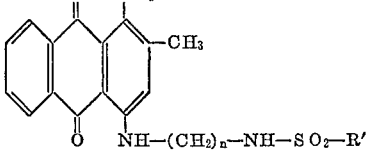 | Reddish blue. |
| 9 | 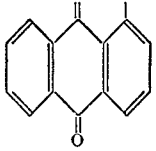 | Orange red. |
| 10 | 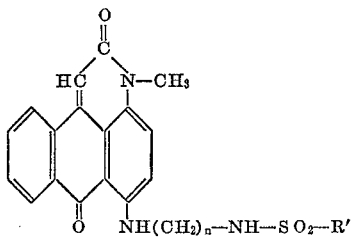 | Bluish red. |
| 11 | 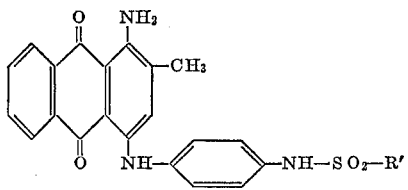 | Reddish blue. |
| 12 | 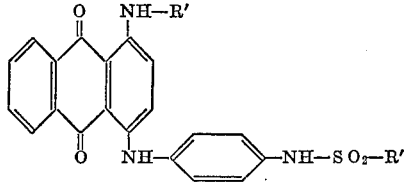 | Greenish blue. |
| 13 | 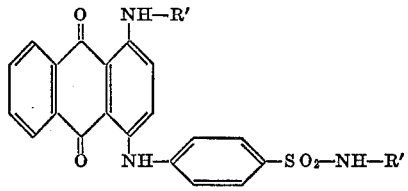 | Do. |
| 14 | 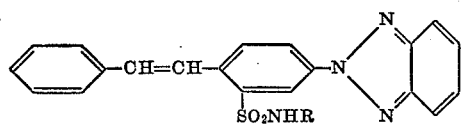 | Bluish white fluorescent. |

| | | Color |
|---|---|---|
| 15 | 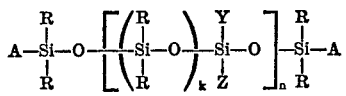 | Do. |

In the above formulae n is 3 or greater and R' is an alkyl or aryl group having at least 6 and up to about 18 carbon atoms. When the chromophoric compound contains 3 or more aromatic rings, R' is alkyl. It may be phenyl or alkyl when the chromophoric compound otherwise includes only 2 aromatic rings. Dyestuffs wherein R' is less than 6 carbon atoms are not suitable because of their poor solubility and dyestuffs having more than one secondary sulfonamide group are not suitable because the presence of two or more reactive sulfonamide groups causes cross-linking of the epoxy organopolysiloxane. Furthermore, dyestuffs containing carboxylic acid or sulfonic acid groups or other acidic groups are not suitable because these groups catalyze the polymerization of the oxirane groups of the epoxy organopolysiloxane. The dyestuffs are thus free from groups of acidity greater than the secondary sulfonamide group.

The organopolysiloxanes of the invention are conveniently prepared by heating a stirred mixture of an epoxy organopolysiloxane with a monosulfonamide chromophoric compound at temperatures of from about 50 to 150° C. and preferably at temperatures of from about 75° C. to about 125° C. for periods of time ranging from about 1 hour to 12 hours or longer. Generally, heating the mixture from about 5 to 10 hours is sufficient to obtain an essentially complete reaction between the epoxy organopolysiloxane and the monosulfonamide chromophoric compound. Two or more chromophoric compounds, e.g., dyestuffs, can be employed concurrently or sequentially if desired; for example, a yellow and a blue dyestuff can be combined to give a green organopolysiloxane.

The proportions of chromophoric compound used are normally from about 0.001 to about 0.25 equivalent and preferably 0.01 to about 0.1 equivalent of monosulfonamido chromophoric compound per epoxy equivalent weight of the epoxy organopolysiloxane. Higher amounts can be used without departing from the scope of the invention. The chromophoric organopolysiloxanes of the invention can therefore be represented by the formula:

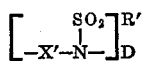

wherein A, R, n and k are as above defined, Y is R or Z and Z is X as above defined and

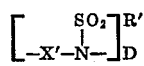

R' being as above defined, D being a chromophoric moiety containing at least two aromatic rings and X' being the reacted form of the oxirane group containing radical X, the groups X and

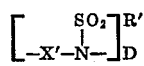

being in proportions of from 0.999 to 0.001 to 0.75 to 0.25. In this formula it will be understood that R' and D may be attached to either

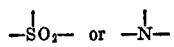

Although the preparation of the curable chromophoric organopolysiloxane may be carried out in an inert solvent such as, for example, benzene, toluene, heptane, and the like which is volutilized after reaction it is generally preferred to carry out the reaction in the absence of solvents. It is usually advantageous to employ a catalyst as for example, 2,4,6-tris(dimethylaminomethyl)phenol in amounts varying from about 0.1 to 5 weight percent and preferably about 1 to 3 weight percent of the weight of the epoxy organopolysiloxane employed.

The curable chromophoric organopolysiloxanes of the invention are substantially highly colored, highly viscous liquids. They are soluble in aliphatic and aromatic hydrocarbons, e.g., butane, hexane, heptane, benzene, toluene, and xylene and chorinated hydrocarbons, e.g., chloroform, ethylene dichloride, chlorobenzene, ortho dichlorobenzene and the like. They are also soluble in silicone fluids and polymers and are readily polymerized alone or copolymerized with other epoxy-containing compounds to produce colored transparent cross-linked resins.

The chromophoric organopolysiloxanes having pendant oxirane groups are cured to cross-linked resins by treatment with a variety of different catalysts which are conventional for oxirane polymerizations such as carboxylic acids, e.g., acetic acid, chloroacetic acid, and oxalic acids; sulfonic acids, e.g., toluene sulfonic acid; inorganic compounds, e.g., aluminum trichloride, boron trichloride and zinc chloride; organometallic compounds, e.g., dibutyltin laurate; and the like. The amount of catalyst utlized varies depending upon the organopolysiloxane and the catalyst selected, generally in the range of from about 0.1% to about 10% by weight. In most instances, the polymerization is accomplished at temperatures between about 25° C. and about 150° C. in the absence of solvents but inert solvent such as heptane, benzene or toluene or the like may be present. Generally, solvents are avoided when bulk or thick polymerizates are desired such as when electrical devices are to be potted. It is generally advantageous to dilute the colored organopolysiloxane with from about 10 to about 50 percent by weight of an inert solvent to which catalyst is then added when a solution of the polymer is to be used as a film or coating on a substrate. The substrate is coated with the mixture and the solvent removed as the organopolysiloxane polymerizes to a cross-linked polymer.

Generally, the organosiloxanes of the invention are homopolymerized in order to maintain the high concentration of the chromophoric moieties and of the siloxane groups because these groups are responsible for color, lubricity, insulating and release properties of the cured polymers. Cured polymers having particular properties can be made by copolymerization of the organopolysiloxanes with other oxirane group-containing compounds such as, for example, butanediol diglycidylether, the glycidyl ether of polyhydric alcohols such as bis-phenol and bis(4-hydroxyphenyl)methane, and the like.

The organosiloxanes of the invention may also be cured to cross-linked resins by mixing them with an equivalent amount of an oxirane curing agent such as a polyamine, e.g., ethylene diamine, aminealdehyde, amidealdehyde; and the like. One suitable oxirane curing agent is the silicone polyamine having repeating dimethylsiloxane and aminoalkylsiloxane groups available under the designation X–5455 from the Union Carbide Company. This compound has a molecular weight of 16,000 and an equivalent weight toward oxirane groups of 400.

The curable organopolysiloxanes of the invention are useful in the preparation of highly colored and highly fluorescent coating and impregnating compositions which are useful for coating, potting and casting.

The invention is more fully described in the following examples. Unless otherwise specified, parts are parts by weight and temperatures are in degrees centigrade.

EXAMPLE 1

A reaction flask equipped with a stirrer, thermometer, and means for maintaining an inert atmosphere in the flask is charged with 2.03 parts 1-amino-4-octylamino-2-(N-octyl) sulfonamidoanthraquinone (finely divided),
60 parts of a glycidyl polymethylsiloxane available from Union Carbide Company as Y–4892 having the approximate structure:

$$HO-\underset{\underset{CH_3}{|}}{\overset{\underset{CH_3}{|}}{Si}}-O-\left[\left(\underset{\underset{CH_3}{|}}{\overset{\underset{CH_3}{|}}{Si}}-O\right)_8\left(\underset{\underset{CH_2-CH-CH_2}{|}}{\overset{\underset{CH_3}{|}}{Si}}-O\right)\right]_{20}\underset{\underset{CH_3}{|}}{\overset{\underset{CH_3}{|}}{Si}}-OH$$

This material is used in other examples. It has an oxirane equivalent weight of 800.

0.2 part of 2,4,6-tris(dimethylaminomethyl) phenol.

The mixture is stirred and heated to 110° C. and held there for 7½ hours while nitrogen is passed into the flask. There is obtained a deep blue-black viscous oil which is the organopolysiloxane having pendant oxirane groups and pendant chromophoric groups in which about 5 percent of the glycidyl oxirane groups have coupled to give radicals of the structure:

[structure: 1-amino-4-octylamino-2-(N-octyl)sulfonamidoanthraquinone with -SO₂-N-(CH₂)₈H and H₂C-CHOH-CH₂- groups, and NH(CH₂)₈H group]

which are the Z groups of the general formula hereinabove.

A portion of the above dark blue organosiloxane having pendant oxirane groups and pendant dye groups is diluted with 10% by weight of heptane and 0.5% of dibutyltin laurate added. The solution is coated on to a glass plate and cured by heating for 15 minutes at 100° C. There is obtained a tough intensely blue transparent coating that is insoluble in all common solvents. This plate can be employed as a blue filter.

EXAMPLE 2

Example 1 is repeated using 1.26 parts of 4-benzenesulfonamidoazobenzene in place of 2.02 parts of 1-amino-4-octylamino-2-(N-octyl)sulfonamidoanthraquinone and heating the mixture for 8 hours at 100° C. There is obtained a deep yellow oil which is an organopolysiloxane having pendant glycidyl groups and about 2% of pendant radicals having the structure:

[structure: phenyl-N=N-phenyl-N-SO₂-phenyl with CH₂-CHOH-CH₂ group]

EXAMPLE 3

Example 1 is repeated using 2.0 parts of 1-methylamino-4-(3′ - octanesulfonamido)propylaminoanthraquinone in place of 2.02 parts of 1-amino-4-octylamino-2-(N-octyl)sulfonamidoanthraquinone and heating the mixture at 100° C. for 8 hours. There is obtained a deep blue oil which is essentially an organopolysiloxane having pendant oxirane groups and pendant groups having the structure:

[structure: anthraquinone with N-CH₂CH₂CH₂-NSO₂-CH₂(CH₂)₆CH₃ and NH-CH₃ groups, with CH₂-CHOH-CH₂ pendant]

on coating a mixture of the above blue oil and 0.5% of dibutyltin laurate on an aluminum plate and heating for 15 minutes at 100° C., there is obtained a tough intensely blue transparent coating that is insoluble in all common solvents.

EXAMPLE 4

Example 1 is repeated using 2.0 parts of 1-amino-4-bromo-2-(N-octyl)sulfonamidoanthraquinone in place of 1-amino - 4 - octylamino-2-(N-octyl)sulfonamidoanthraquinone. There is obtained a dark brown oil which is essentially an organopolysiloxane having pendant glycidyl radicals and pendant dyestuffs Z radicals having the structure:

[structure: anthraquinone with NH₂, -SO₂-N-CH₂(CH₂)₆CH₃ and Br groups, with CH₂-CHOH-CH₂ pendant]

A mixture of the above oil with 0.5% of dibutyltin laurate is coated onto a glass plate and heated at 100° C. for 15 minutes. There is obtained a deep orange clear film. The coated glass is suitable as a light filter.

By mixing the above oil with an equal amount of a silicone polyamine, available from the Union Carbide Company under the designation Y–5455, and coating the mixture on to a glass plate and heating for 30 minutes at 100° C. there is obtained a deep orange, clear film having a slight surface tack. After standing at room temperature for 2½ days, its color changes to blue grey. After about 3 weeks time, the color is changed to deep blue. This color change is probably due to continued reaction of the active bromine atom of the dye group with the amine group in the silicone polyamine.

EXAMPLE 5

Ten parts of the dark blue organosiloxane having pendant oxirane groups and pendant dye groups as prepared in Example 1 is mixed with 5 parts of the silicone polyamine, Y–5455, and the mixture coated onto a glass plate and heated for 15 minutes at 100° C. There is obtained a tough blue transparent coating that is insoluble in all common solvents. The plate is suitable as a light filter.

By repeating the above procedure using the viscous organopolysiloxane prepared in Example 2 in place of the organopolysiloxane of Example 1, similar results are obtained.

EXAMPLE 6

Example 1 is repeated replacing the sulfonamidoanthraquinone with 2.02 parts of the fluorescent stilbene-benzothiazole prepared by sequential reaction in dimethylformamide of 2-(stilbyl-4′)-1,2,3-benzotriazole-2′-sulfonic acid (U.S. Pat. 2,713,057) with thionyl chloride and octadecyl amine and having the structure:

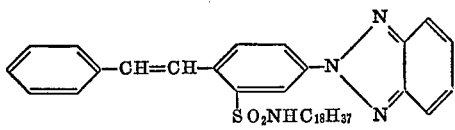

The product is a yellow oil which fluoresces bluish white in ultraviolet light. It is an organopolysiloxane having pendant oxirane groups and chromophoric groups corresponding to the stilbene-benzotriazole. When polymerized on a glass plate, as in Example 1, a fluorescent coating is obtained.

What is claimed is:

1. The process for preparing a curable organopolysiloxane having pendant polymerizable oxirane groups and pendant chromophoric groups which comprises reacting
   (A) an oxirane group containing siloxane represented by the general formula:

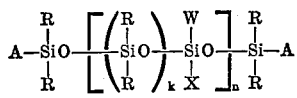

wherein
   R is methyl, ethyl or phenyl
   A is R, OH or halogen.
   X is aliphatic oxirane-group-containing radical,
   W is X or R,
   k is 2 to about 20, and
   n is about 5 to about 30
   (B) a monosulfonamido substituted chromophoric compound represented by the general formula:

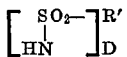

wherein
   D is the chromophoric nucleus of chromophoric compound comprising at least two aromatic rings and possessing unsaturated atomic chromophore groupings and free from groups of greater acidity than the

and
   R' contains from 6 to 18 carbon atoms and is alkyl when D contains 3 or more aromatic rings, and is alkyl or aryl when D contains 2 aromatic rings and
   wherein
   when R' is substituted on

D is attached to

and
   when R' is substituted in

D is attached to

by heating together at about 50 to 150° C. for from 1 to about 12 hours in proportions of 0.001 to 0.25 equivalent of monosulfonamide per oxirane equivalent of said siloxane whereby organopolysiloxane with pendant oxirane group and pendant chromophoric group represented by the formula:

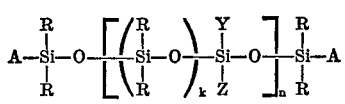

is obtained, wherein
   A, R, k and n are as above defined,
   Y is R or X,
   Z is 0.999 to 0.75 equivalent of X as above defined and 0.001 to 0.25 equivalent of

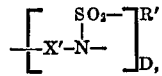

R' and D are as above defined, and
   X' is the reacted form of X in which

—CHOH—CH$_2$— replaces the oxirane group

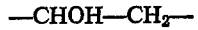

of the radical X.

2. The process according to claim 1 wherein the aliphatic oxirane-group-containing radical X is glycidyl.

3. The process according to claim 1 wherein the chromophoric nucleus D comprises as chromogenic structure an azobenzene structure.

4. The process according to claim 1 wherein the chromophoric nucleus D comprises a chromogenic structure an anthraquinone structure.

5. Organic polysiloxane of the structure:

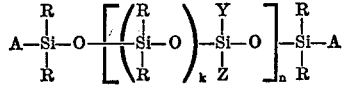

wherein
R is methyl, ethyl or phenyl,
A is R, OH or halogen
Z is X and

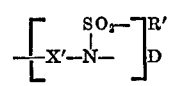

Y is R or Z,
X is aliphatic oxirane group containing radical,
X' is the reacted form of X in which

—CH$_2$OH—CH$_2$— replaces the oxirane group

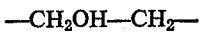

of the radical X,
D is chromophoric nucleus of chromophoric compound containing at least two aromatic rings and possessing unsaturated atomic chromophore groupings and free from groups of acidity greater than

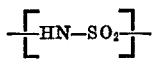

R' is unsubstituted alkyl or aryl hydrocarbon group of 6 to 18 carbon atoms when D contains two aromatic rings and R' is alkyl of 6 to 18 carbon atoms when D contains 3 or more aromatic rings,
k is 2 to about 20 and,
n is about 5 to about 30,
Z being comprised of the two groups in proportion of between about 0.999 equivalent of oxirane to about 0.001 equivalent of sulfonamido substituted chromophoric moiety and about 0.75 equivalent of oxirane to about 0.25 equivalent of sulfonamido substituted chromophoric moiety.

6. Organic polysiloxane according to claim 5 wherein the chromophoric nucleus D comprises an azobenzene structure.

7. Organic polysiloxane according to claim 5 wherein the chromophoric nucleus D comprises an anthraquinone structure.

8. Organic polysiloxane according to claim 5 wherein Z is
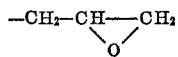
and
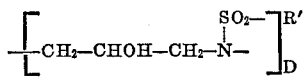
9. Organic polysiloxane according to claim 5 wherein the chromophoric nucleus D comprises a stilbyl-benzotriazole structure.
References Cited
UNITED STATES PATENTS
3,699,135   10/1972   Baptista et al. _____ 260—37 SB
3,455,877   7/1969   Plueddemann _____ 260—46.5
DONALD E. CZAJA, Primary Examiner
M. I. MARQUIS, Assistant Examiner
U.S. Cl. X.R.
8—DIG. 1; 117—124 F, 135.1; 204—159.13; 260—18 S, 37 SB, 46.5 G, 46.5 Y, 47 R, 448.2 N, 825

UNITED STATES PATENT OFFICE
CERTIFICATE OF CORRECTION

Patent No. 3,741,932                    Dated June 26, 1973

Inventor(s) Carl M. Smith

It is certified that error appears in the above-identified patent and that said Letters Patent are hereby corrected as shown below:

Column 2, line 35 the formula --$CO_2H$-- should be inserted before "-$NO_2$-" and the part of the formula reading C=C, C≡C should read -- C=C, -C≡C-,.
Column 2, No. 3 " 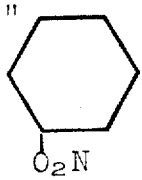 should read -- 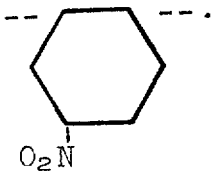 --.

Column 3, No. 14, last line "$SO_2NHR$" should read --$SO_2NHR'$--.
Column 8, line 29 "dyestuffs" should read --dyestuff--.
Column 10, line 3 "Y is R or X" should read --Y is R or Z--.

Signed and sealed this 25th day of December 1973.

(SEAL)
Attest:

EDWARD M. FLETCHER, JR.         RENE D. TEGTMEYER
Attesting Officer               Acting Commissioner of Patents